W. HEISSENBUTTEL.
Foot-Warmers.

No. 144,095. Patented Oct. 28, 1873.

Witnesses.
Ernst Bilhuber
Chas. Wahlers.

Inventor.
William Heissenbuttel
per
Van Santvoord & Hauff
attys

UNITED STATES PATENT OFFICE.

WILLIAM HEISSENBUTTEL, OF BROOKLYN, NEW YORK.

IMPROVEMENT IN FOOT-WARMERS.

Specification forming part of Letters Patent No. 144,095, dated October 28, 1873; application filed September 27, 1873.

*To all whom it may concern:*

Be it known that I, WILLIAM HEISSENBUTTEL, of Brooklyn, in the county of Kings and State of New York, have invented a certain new and useful Improvement in Foot-Warmers; and I do hereby declare that the following is a full, clear, and exact description thereof, sufficient to enable those skilled in the art to make and use the same, reference being had to the accompanying drawing making a part of this specification, in which drawing—

Figure 1:
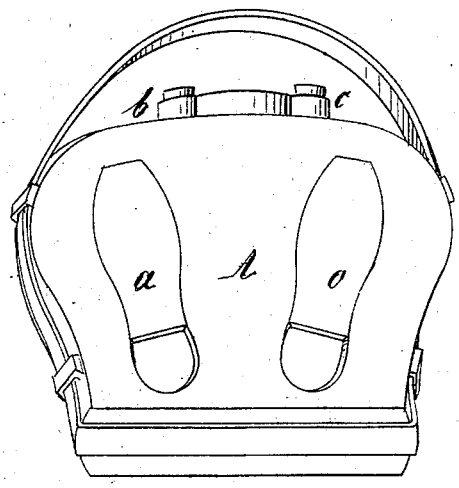
Figure 2:
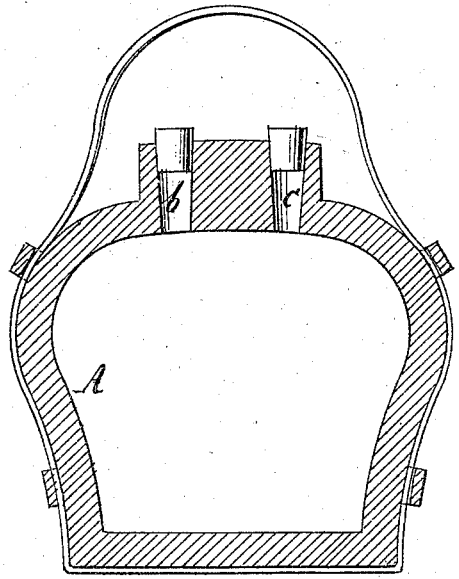

Figure 1 represents a perspective view of the invention. Fig. 2 is a horizontal section of the same.

Similar letters of reference indicate corresponding parts in the several figures.

This invention relates to that class of devices known as foot-warmers, and has for its object the production of a new article of manufacture, which will be cheap and easily constructed, and at the same time be as durable and effective as those of more costly and complex construction.

The devices heretofore constructed for this purpose have been made of metal, within which hot water has been introduced. Such are more or less objectionable, from the fact that the sides are soon pressed in; and, further, it is difficult to keep the feet in position upon the plane-surfaced vessel, especially when riding; and to remedy this objection wooden cases are constructed, within which the metal vessel is placed, the outside of the case being cushioned so as to impart a finish to the article, protect the vessel, and, further, to afford a frictional foothold.

To improve upon such is the object of my invention, which consists of a vessel molded from clay, the thickness of which will be regulated according to the size of the vessel desired to be produced, said vessel being provided with depressions for receiving the feet, and with two openings, one of which serves to introduce hot water, &c., or sand, while the other allows the displaced air to escape; the whole device being constructed in such a manner that it can be conveniently filled and discharged, that it can be easily carried, and that the same, when filled with hot water or sand, will serve to keep the feet, which are to be placed into the depressions provided for their reception, warm for a long time, the vessel being provided with a handle, as hereinafter specified.

In the drawing, the letter A designates a vessel, which is made of clay or analogous material, of convenient size and shape. Both sides of the vessel are flat, and provided with depressions $a$ $a$, large enough to admit the feet of a grown person, the depressions preferably conforming to the shape of a shoe or boot, and of a depth sufficient so that the shoulder produced will afford a substantial foothold, and thus enable a person to retain the feet upon the warmer. In the neck B of this vessel are two apertures, $b$ $c$, one of which is used to introduce hot water or sand, while the other allows the air which is displaced by the water or sand to escape from the vessel. When the vessel is filled both these apertures are stopped up. On the edge of the vessel A are formed loops for the reception of a strap that serves to carry the foot-warmer. When this foot-warmer is filled with hot water or sand it retains the heat for a long time, and the feet, which find a convenient place in the depressions, are prevented from getting cold.

What I claim as my invention is—

The foot-warmer herein described, consisting of the earthenware vessel A provided with depressions $a$ $a$, passages $b$ $c$, and a transporting-handle, substantially as and for the purpose specified.

WM. HEISSENBUTTEL.

Witnesses:
W. HAUFF,
E. F. KASTENHUBER.